(12) United States Patent
Kim et al.

(10) Patent No.: US 12,197,278 B2
(45) Date of Patent: Jan. 14, 2025

(54) SYSTEM, APPARATUS AND METHOD WITH FAULT RECOVERY

(71) Applicants: Samsung Electronics Co., Ltd., Suwon-si (KR); Seoul National University R & DB Foundation, Seoul (KR)

(72) Inventors: Yongdeok Kim, Hwaseong-si (KR); Kyung Geun Lee, Seoul (KR); Jeong Yoon Eo, Seoul (KR); Byung Gon Chun, Seoul (KR); Ahn Jae Shin, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 70 days.

(21) Appl. No.: 17/954,508

(22) Filed: Sep. 28, 2022

(65) Prior Publication Data

US 2023/0139091 A1    May 4, 2023

(30) Foreign Application Priority Data

Nov. 1, 2021    (KR) .................. 10-2021-0148296

(51) Int. Cl.
*G06F 11/00*    (2006.01)
*G06F 11/07*    (2006.01)

(52) U.S. Cl.
CPC ...... *G06F 11/0793* (2013.01); *G06F 11/0721* (2013.01)

(58) Field of Classification Search
CPC .................. G06F 11/0793; G06F 11/0721

USPC ....................................................... 714/1–57
See application file for complete search history.

(56) References Cited

U.S. PATENT DOCUMENTS

| | | | | |
|---|---|---|---|---|
| 2003/0051190 A1* | 3/2003 | Marisetty | ............. | G06F 11/2242 714/11 |
| 2006/0143525 A1* | 6/2006 | Kilian | ..................... | G06F 9/505 714/31 |
| 2011/0209154 A1* | 8/2011 | Gooding | ............... | G06F 9/3842 718/103 |

(Continued)

FOREIGN PATENT DOCUMENTS

JP        2019-82900 A    5/2019

OTHER PUBLICATIONS

Lee, "Elastic Distributed Training of Deep Neural Networks", XP093023814, https://s-space.snu.ac.kr/bitstream/10371/177682/1/1/000000167904.pdf, Aug. 1, 2021, (45 pages in English).

(Continued)

*Primary Examiner* — Sarai E Butler
(74) *Attorney, Agent, or Firm* — NSIP Law

(57) ABSTRACT

A system with fault recovery includes: a plurality of worker nodes configured to perform distributed training; and a master node configured to control the plurality of worker nodes, wherein the master node is configured to: detect a fault of the plurality of worker nodes based on a predetermined period; adjust a collective communication participant list in response to the detecting of the fault; and transmit the adjusted participant list to one or more worker nodes in the adjusted participant list.

18 Claims, 7 Drawing Sheets

(56) References Cited

U.S. PATENT DOCUMENTS

| | | | |
|---|---|---|---|
| 2012/0131139 A1* | 5/2012 | Siripurapu | H04L 65/60 709/217 |
| 2013/0086619 A1* | 4/2013 | Martell | H04L 65/65 725/114 |
| 2014/0025999 A1* | 1/2014 | Kessler | G06F 9/4411 710/110 |
| 2015/0186206 A1* | 7/2015 | Bhattacharya | G06F 11/3027 714/3 |
| 2019/0332938 A1 | 10/2019 | Gendron-Bellemare et al. | |
| 2020/0065303 A1* | 2/2020 | Bhattacharjee | G06F 16/278 |
| 2020/0364561 A1 | 11/2020 | Ananthanarayanan et al. | |
| 2021/0065002 A1 | 3/2021 | Samek et al. | |
| 2021/0182660 A1* | 6/2021 | Amirguliyev | G06N 3/084 |
| 2021/0227024 A1* | 7/2021 | Glass | G06F 8/71 |
| 2022/0101178 A1* | 3/2022 | Da Silva | G06N 20/10 |
| 2022/0108209 A1* | 4/2022 | Pudipeddi | G06F 12/109 |

OTHER PUBLICATIONS

Anonymous, "Elastic Horovod—Horovod Documentation", XP093028l6, https://web.archive.org/web/20211023172139/https://horovod.readthedocs.io/en/stable/elastic_include.html, Oct. 23, 2021, (6 pages in English).

Anonymous, "Rendezvous—PyTorch/Elastic master documentation", XP093023850, https://web.archive.org/web/20200609150710/https://pytorch.org/elastic/0.20rc1/rendezvous.html, Jun. 9, 2020, (6 pages in English).

Extended European search report issued on Feb. 27, 2023, in counterpart European Patent Application No. 22204763.1 (7 pages in English).

* cited by examiner

SYSTEM, APPARATUS AND METHOD WITH FAULT RECOVERY

CROSS-REFERENCE TO RELATED APPLICATIONS

This application claims the benefit under 35 USC § 119(a) of Korean Patent Application No. 10-2021-0148296, filed on Nov. 1, 2021 in the Korean Intellectual Property Office, the entire disclosure of which is incorporated herein by reference for all purposes.

BACKGROUND

1. Field

The following description relates to a system, apparatus, and method with fault recovery.

2. Description of Related Art

When a fault occurs in a distributed training operation process of a deep neural network (DNN), 1) a manual recovery of a worker process and 2) a state restoration through disk checkpoints may recover an operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system with fault recovery includes: a plurality of worker nodes configured to perform distributed training; and a master node configured to control the plurality of worker nodes, wherein the master node is configured to: detect a fault of the plurality of worker nodes based on a predetermined period; adjust a collective communication participant list in response to the detecting of the fault; and transmit the adjusted participant list to one or more worker nodes in the adjusted participant list.

For the detecting of the fault, the master node may be configured to receive a state signal for verifying whether the fault occurred in a worker process performed by a corresponding worker node from each of the plurality of worker nodes.

For the detecting of the fault, the master node may be configured to determine whether the fault occurred in the worker process based on the state signal.

For the adjusting of the collective communication participant list, the master node may be configured to adjust the collective communication participant list by excluding a worker node in which the fault occurred in response to the detecting of the fault.

Each of the plurality of worker nodes may be configured to store, in a first memory, a copy of a working state performed in a corresponding period in response to the fault not occurring in the corresponding period.

Each of the one or more worker nodes in the adjusted participant list may be configured to load a copy stored in a first memory and perform the distributed training based on the copy.

The system may include a remote process execution module configured to re-execute a worker process of a recovered worker node in response to a worker node, in which the fault occurred, being recovered.

The master node may be configured to adjust the collective communication participant list by adding the recovered worker node in response to the worker process being re-executed.

In another general aspect, an apparatus with fault recovery includes: one or more processors configured to: receive a state signal for verifying whether a fault occurred in a worker process performed by a corresponding worker node from each of a plurality of worker nodes in a collective communication participant list; determine whether the fault occurred in the worker process based on the state signal; adjust the participant list by excluding, from the participant list, a worker node in which the fault occurred based on a determination that the fault occurred; and transmit the adjusted participant list to one or more worker nodes in the adjusted participant list.

In another general aspect, a processor-implemented method with fault recovery includes: detecting, by a master node, a fault of a plurality of worker nodes based on a predetermined period; adjusting, by the master node, a collective communication participant list in response to the detecting of the fault; transmitting, by the master node, the adjusted participant list to one or more worker nodes in the adjusted participant list; and training a predetermined number of mini batches in each of the one or more worker nodes in the adjusted participant list.

The detecting of the fault further may include receiving, by the master node, a state signal for verifying whether the fault occurred in a worker process performed by a corresponding node from each of the plurality of worker nodes.

The detecting of the fault further may include determining, by the master node, whether the fault occurred in the worker process based on the state signal.

The adjusting of the collective communication participant list may include adjusting, by the master node, the collective communication participant list by excluding a worker node in which the fault occurred in response to the detecting of the fault.

The method may include storing, in a first memory, a copy of a working state performed in a corresponding period in response to the fault not occurring in the corresponding period in each of the plurality of worker nodes.

The training of the mini batches may include loading a copy stored in a first memory and performing distributed training based on the copy in each of the plurality of worker nodes.

The method may include re-executing, in a remote process execution module, a worker process of a recovered worker node in response to a worker node, in which the fault occurred, being recovered.

The method may include adjusting, by the master node, the collective communication participant list by adding the recovered worker node in response to the worker process being re-executed.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with fault recovery includes: receiving a state signal for verifying whether a fault occurs in a worker process performed by a corresponding worker node from each of a plurality of worker nodes in a collective communication participant list; determining whether the fault occurs in the worker process based on the state signal; adjusting the participant list by excluding, from the participant list, a worker node in which the fault occurs based on a determination that the fault occurred; and transmitting the adjusted participant list to one or more worker nodes in the adjusted participant list.

In another general aspect, a processor-implemented method with fault recovery includes: transmitting, by a worker node in a collective communication participant list, a state signal for verifying whether a fault occurs in a worker process performed by the worker node; receiving, by the worker node, an adjusted participation list excluding another worker node performing a worker process in which the fault occurred; and training, by the worker node, a predetermined number of mini batches in response to receiving the adjusted participation list.

The method may include reading, by the worker node, an in-memory checkpoint of a first memory of the worker node in response to receiving the adjusted participation list, wherein the training may include training the predetermined number of mini batches in response to reading the in-memory checkpoint.

The method may include writing, to the first memory, a model parameter generated by the training as another in-memory checkpoint in response to determining that the training is not complete.

The first memory may be a general memory of the worker node, and a second memory of the worker node may be a dedicated module for driving an artificial neural network to perform the training.

Other features and aspects will be apparent from the following detailed description, the drawings, and the claims.

Figure 1:
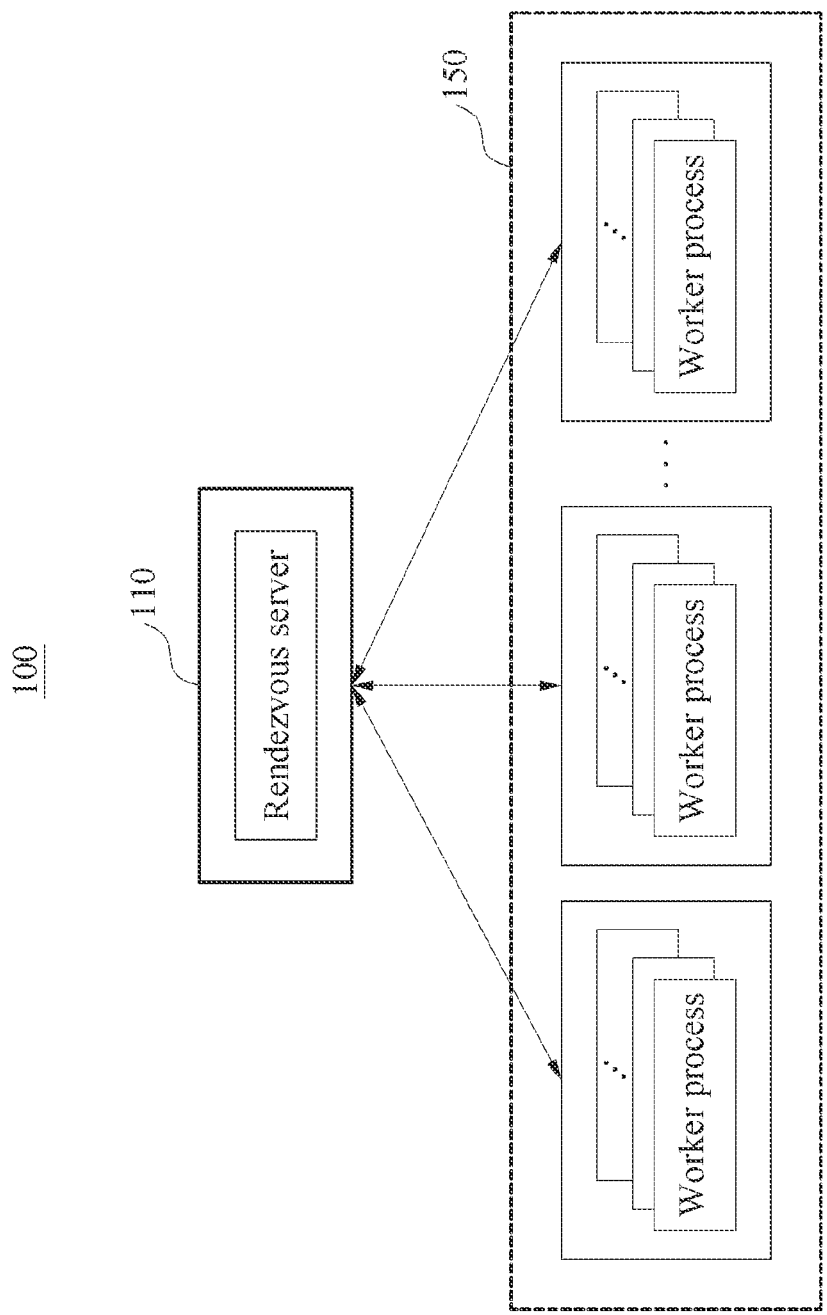
FIG. 1 illustrates an example of a fault recovery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first," "second," and "third" are used to explain various members, components, regions, layers, or sections, these members, components, regions, layers, or sections are not limited by these terms. Rather, these terms should be used only to distinguish one member, component, region, layer, or section from another member, component, region, layer, or section. For example, a "first" member, component, region, layer, or section referred to in the examples described herein may be referred to as a "second" member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. It should be further understood that the terms "comprises/including" and/or "includes/including," when used in this specification, specify the presence of stated features, integers, steps, operations, elements, components, and/or a combination thereof, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The following examples may be, or be embodied in, various types of products, for example, a personal computer (PC), a laptop computer, a tablet computer, a smart phone, a television (TV), a smart home appliance, an intelligent vehicle, a kiosk, and/or a wearable device. Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a fault recovery system.

When a distributed training operation (e.g., a distributed training operation of a deep neural network (DNN)) that performs distributed processing simultaneously uses a plurality of computational modules (e.g., a central processing unit (CPU), a graphics processing unit (GPU), and/or a neural processing unit (NPU)) for a long time, there may be a high probability of an unexpected fault occurring, and thus a fault may be resolved to preserve operation execution contents.

When a fault occurs in a distributed training operation of a DNN, 1) a manual recovery of a worker process and 2) a state restoration through disk checkpoints may recover an operation.

Here, 1) the manual recovery of a worker process may be a method in which a person manually re-executes a worker process that was abruptly terminated due to a fault, and 2) the state restoration through disk checkpoints may be a state of a re-executed worker process (e.g., a model parameter, etc.) being restored by a checkpoint state saved on the disk before the fault occurs.

However, a typical method of manually recovering a worker process and restoring a state through a disk checkpoint may have the following issues. 1) When a fault occurs, a person may need to manually verify and recover the fault, which prolongs a down time of the job until the fault is recovered. Constant monitoring may need to be performed by the person to manage the fault accordingly. 2) When a disk has relatively slower read/write speed than a memory, a high frequency of checkpointing an operation state on the disk may affect a training speed. However, when a disk checkpoint frequency is set extremely low to avoid affecting the training speed, a re-computation cost may be great because there is a high probability of restoring the state to a previous old state when the state is being recovered due to the fault.

In addition, the size of models and datasets may be large, thereby increasing a fault rate. Thus, having the issues described above, the typical method of recovering the worker process and restoring the state may not effectively respond to the fault.

In contrast, the fault recovery system of one or more embodiments described herein may resolve the issues of the typical method described above using 1) a worker process recovery method through a dynamic rendezvous and 2) an in-memory checkpoint method.

Referring to FIG. 1, a fault recovery system 100 may include a master node 110 and a plurality of worker nodes 150 as a main body.

The master node 110 may be or include a rendezvous server. The master node 110 in the center may monitor and control the plurality of worker nodes 150 through the rendezvous server.

The worker nodes 150 may be subjects that perform distributed training, and an operation performed by each worker node may be defined as a worker process. For example, the worker nodes 150 may perform distributed training through data parallel processing. Each of the worker nodes 150 may be or include one or more computational modules (e.g., a central processing unit (CPU), a graphics processing unit (GPU), and/or a neural processing unit (NPU)) to perform a corresponding portion of the distributed training.

The master node 110 in the center may monitor a health state of a worker process performed by a corresponding worker node from each of a plurality of worker nodes. Here, the health state of the worker process may indicate whether (e.g., whether or not) a fault has occurred in the worker process. A state in which a fault has not occurred may be a state in which the worker process is healthy (as a non-limiting example, the master node 110 may determine a worker process performed by a worker node to be in a healthy state when the master node 110 detects that a fault has not occurred in the worker process). When the master node 110 detects that a fault has occurred in one or more worker processes (e.g., one or more worker processes performed by one or more of the worker nodes 150), the master node 110 may perform an operation for recovering the fault.

For example, in a typical fault recovery system, when one or more worker processes are abnormally terminated due to a fault in a training process, all remaining workers may be abnormally terminated because worker processes that are abnormally terminated due to the fault may be removed from a collective communication participant list without undergoing a suitable process.

In contrast, when a fault occurs in one or more worker processes, the remaining worker processes may resume training normally without being abnormally terminated when the fault recovery system 100 of one or more embodiments automatically detects a fault, and the fault recovery system 100 of one or more embodiments may suitably readjust the collective communication participant list for the remaining worker processes. Thus, the fault recovery system 100 of one or more embodiments may use the 1) worker process recovery method through the dynamic rendezvous, as described above.

In addition, even when a fault occurs in one or more worker processes in the training process, the fault recovery system 100 of one or more embodiments may prevent a loss of training results caused by the fault even without checkpointing to a disk by copying and storing a state of a model parameter in CPU memory of the remaining worker processes. Thus, the fault recovery system 100 of one or more embodiments may use the 2) in-memory checkpoint method, as described above.

When dynamic random-access memory (DRAM) has a significantly faster reading/writing speed compared to a persistent storage device (e.g., a disk), checkpoints may be generated at a higher frequency than the disk, which greatly reduces re-computation costs when a fault occurs. In addition, when a state is restored back to its original state in response to the fault occurring, a fast-reading speed of the memory may reduce a downtime when the fault occurs because the state can be restored quickly using a faster reading speed of the memory than the disk.

Figure 2:
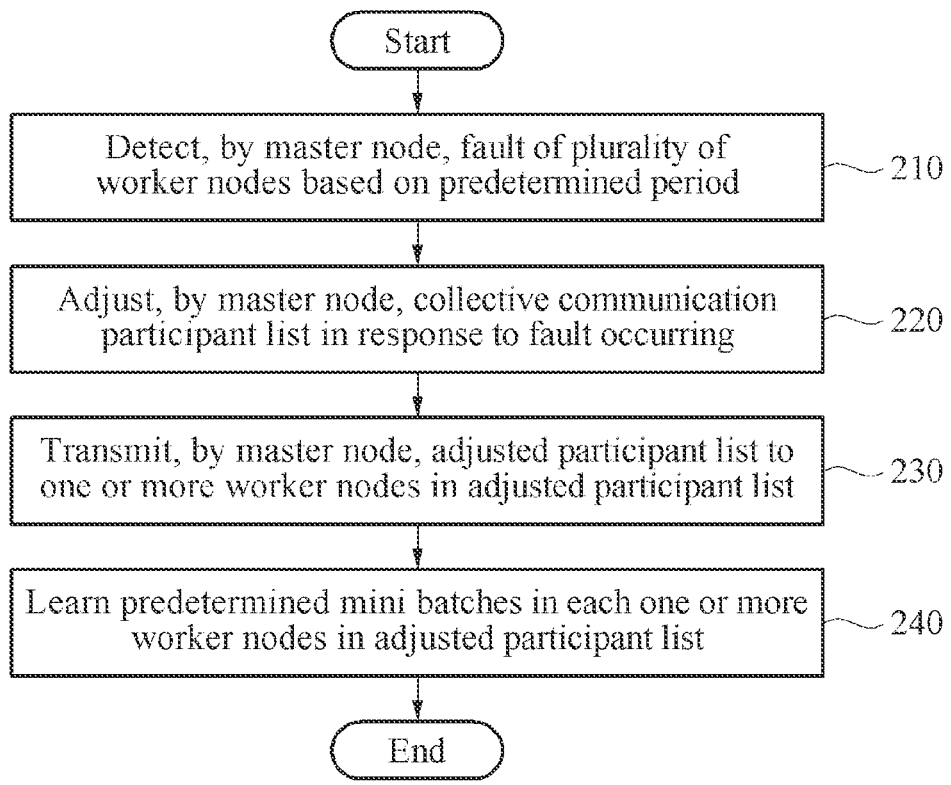
FIG. 2 illustrates an example of a worker process fault recovery method through a dynamic rendezvous.

FIG. 2 illustrates an example of worker fault process recovery method through a dynamic rendezvous.

Operations illustrated in FIG. 2 may be performed in the illustrated order and method. However, the order of one or more operations may be changed, or one or more operations may be omitted, without departing from the spirit and scope of the illustrated example. The operations illustrated in FIG. 2 may be performed in parallel or simultaneously. In FIG. 2, one or more blocks and a combination thereof may be implemented by a special-purpose hardware-based computer that performs a predetermined function, and/or special-purpose hardware implementing computer instructions. The description provided with reference to FIG. 1 may be also applied to FIG. 2. Thus, a more detailed description thereof is omitted for brevity.

When a fault occurs in one or more worker processes, a master node (the master node 110 of FIG. 1, as a non-limiting example) may automatically detect the fault and suitably readjust a collective communication participant list for the remaining worker processes.

For example, in operation 210, the master node may detect the fault of a plurality of worker nodes (the plurality of worker nodes 150 of FIG. 1, as a non-limiting example) based on a predetermined period. The master node may receive, from each of the plurality of worker nodes, a state signal for verifying whether a fault occurred in the worker process performed by the corresponding worker node and determine whether the worker process is faulty based on the state signal.

For example, the master node may receive a health state verification message from each worker node based on the predetermined period. When the master node does not receive the health state verification message in the predetermined period (e.g., from a corresponding worker node), the master node may determine that a fault occurred in the corresponding worker node.

In operation 220, when a fault occurs (e.g., when the master node determines that the fault occurred), the master node may adjust a collective communication participant list. When the fault occurs, the master node may adjust the participant list by excluding a worker node in which the fault occurred (e.g., the corresponding worker node).

In operation 230, the master node may transmit the adjusted participant list to one or more worker nodes in the adjusted participant list. For example, when the master node detects that a fault has occurred in one or more worker processes, the master node may create a new collective communication participant list (hereinafter simply referred to as the new participant list) excluding a faulty worker process and transmit the new participant list to the remaining normal worker processes.

In operation 240, a worker node may learn a predetermined number of mini batches from each of the one or more worker nodes in the adjusted participant list. Normal (e.g., non-excluded) worker nodes that have received the new participant list may resume training based on the new participant list. Here, the new participant list may not include a worker process in which the fault has occurred, and thus a normal training process may be resumed.

Figure 3:
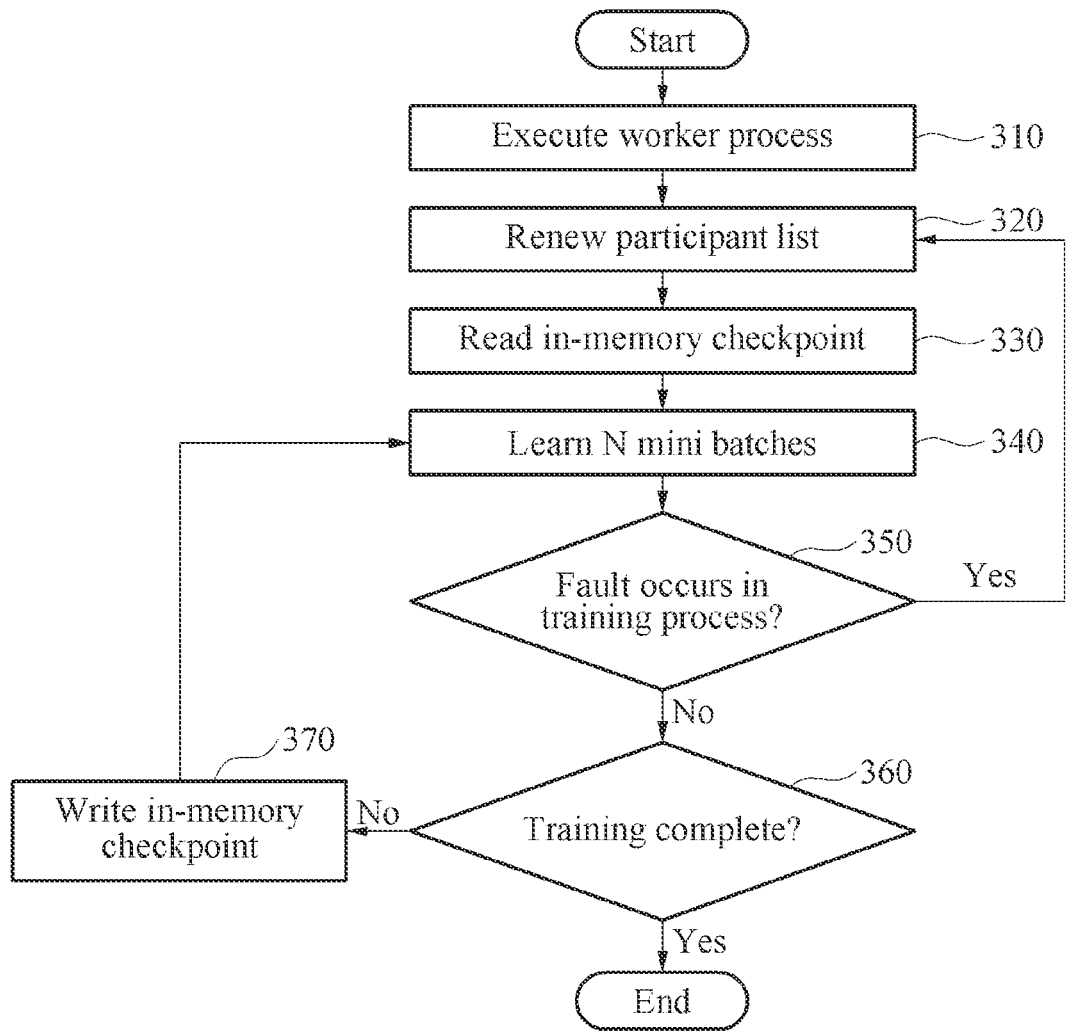
FIG. 3 illustrates an example of a fault recovery method.

FIG. 3 illustrates an example of a fault recovery method.

Operations may be performed in the sequence and manner as illustrated in FIG. 3. However, the order of one or more operations may be changed, or one or more of the operations may be omitted, without departing from the spirit and scope of the illustrative examples described. The operations in FIG. 3 may be performed in parallel or simultaneously. In FIG. 3, one or more blocks and a combination thereof may be implemented by a special-purpose hardware-based computer that performs a predetermined function, and/or special-purpose hardware implementing computer instructions. The descriptions of FIGS. 1 and 2 may also apply to FIG. 3. Thus, a more detailed description thereof is omitted for brevity.

In operation 310, a worker node (a worker node of the plurality of worker nodes 150 of FIG. 1, as a non-limiting example) may execute an initial worker process.

In operation 320, a master node (the master node 110 of FIG. 1, as a non-limiting example) may renew a collective communication participant list. The collective communication participant list may be a list of worker nodes participating in distributed training in a current period.

In operation 330, the worker node may read an in-memory checkpoint. When there is not a checkpoint in CPU memory immediately after training starts, checkpoint reading may be omitted.

In operation 340, the worker node may be trained with N mini batches. Here, N may be a checkpoint period.

In operation 350, the master node may determine whether a fault has occurred in the training process.

When the master node determines that the fault has not occurred in operation 350, in operation 360, the worker node may determine whether training is complete based on the determination that no fault has occurred.

When the worker node determines that training is not complete (e.g., is incomplete) in operation 360, in operation 370, the worker node may store a copy (e.g., a model parameter) of an operation state performed in the corresponding period in a first memory of a processor (e.g., of the worker node) based on the determination that the training is incomplete. In an example, the first memory may be memory included in the CPU, but is not limited thereto. For example, the first memory may include general memory (e.g., main memory, a hard disk, and/or cache memory) other than GPU memory.

When the fault occurs while the next N mini batches are being learned, the master node may detect the fault in operation 350, and, in response, the master node that detected the fault may renew and transmit a new participant list to the remaining normal worker nodes based on the determination that the fault occurred in operation 320.

Thereafter, in operation 330, the worker node may restore the work to a final checkpoint state because the fault has occurred in the training process.

Figure 4A:
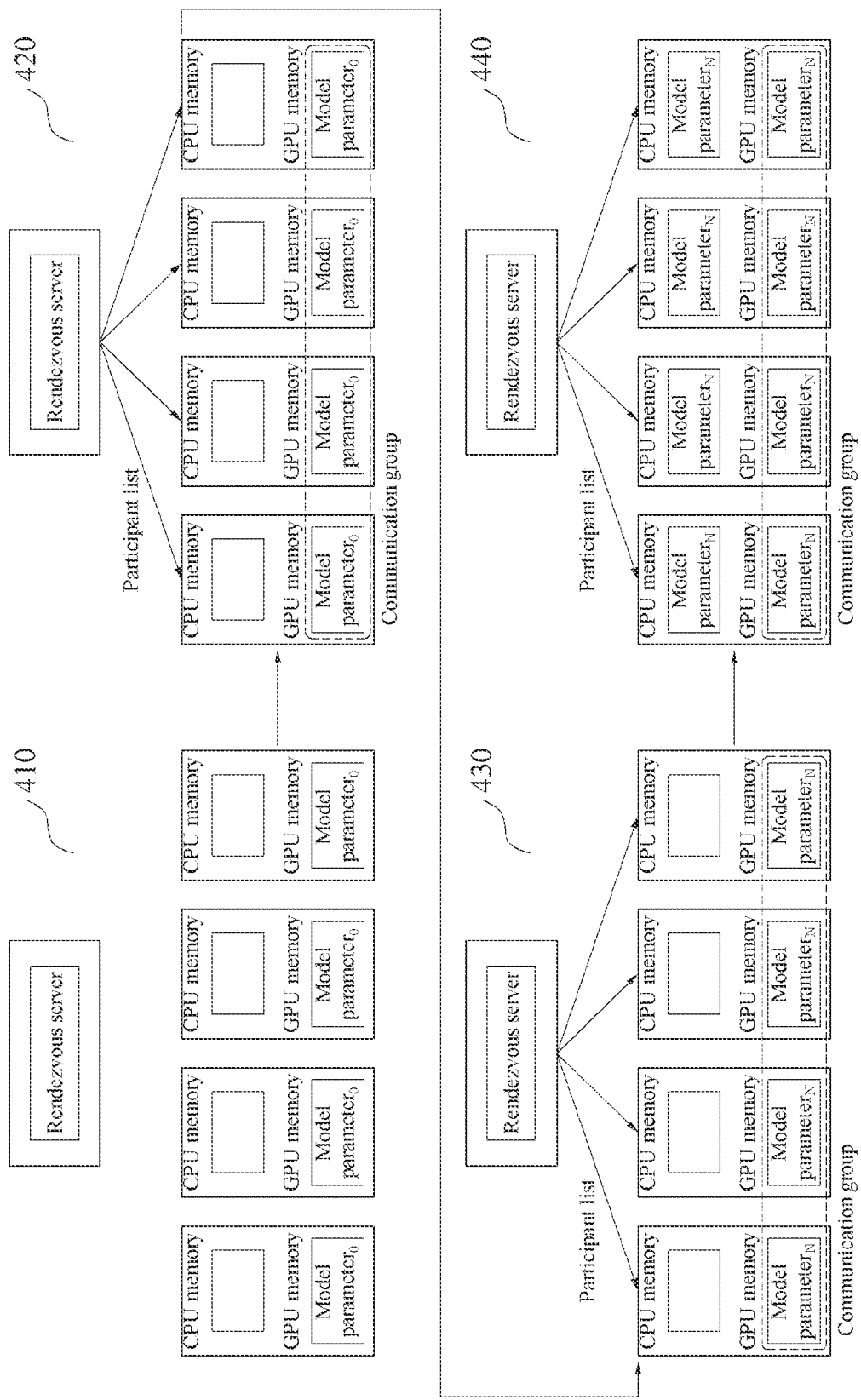
FIGS. 4A and 4B illustrate an example of a process of automatically recovering a distributed training operation using a dynamic rendezvous and an in-memory checkpoint from a fault.
Figure 4B:
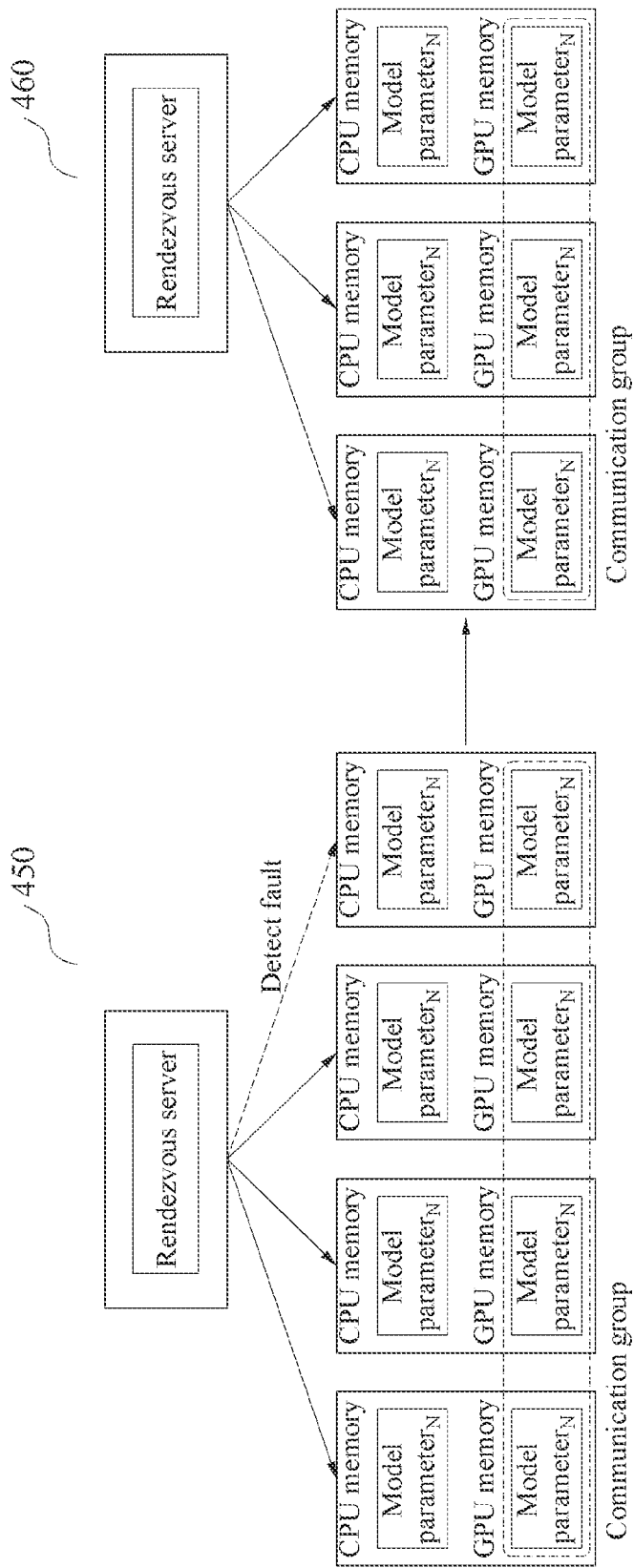

FIGS. 4A to 4B illustrate a process of automatically recovering a distributed training operation using a dynamic rendezvous and in-memory checkpoints from a fault. The descriptions of FIGS. 1 to 3 may apply to FIGS. 4A and 4B. Thus, a more detailed description thereof is omitted for brevity.

FIG. 4A illustrates a state of a master node (the master node 110 of FIG. 1, as a non-limiting example) and worker nodes (the plurality of worker nodes 150 of FIG. 1, as a non-limiting example) when a fault does not occur.

Referring to FIG. 4A, diagram 410 illustrates a state of the master node and the worker nodes corresponding to operation 310 when a fault does not occur, and each of the worker nodes may load a model parameter corresponding to a predetermined period in a second memory to perform a worker process. In FIGS. 4A and 4B, the second memory may be GPU memory, but is not limited thereto. The second memory may be a dedicated module for driving an artificial neural network (ANN) (e.g., an NPU, a tensor processing unit (TPU), a neural engine, a GPU, and/or memory included in a digital signal processor (DSP)).

Diagram 420 illustrates a state of the master node and the worker nodes corresponding to operation 320 when a fault does not occur, and the master node may renew the collective communication participant list.

Diagram 430 illustrates a state of the master node and the worker nodes corresponding to operation 340 when a fault does not occur, and each of the worker nodes may be trained with N mini batches.

Diagram 440 illustrates a state of the master node and the worker nodes corresponding to operation 370. When a fault does not occur while the N mini batches are being learned, each of the worker nodes may checkpoint a copy of an operation state including the model parameter.

FIG. 4B illustrates a state of a master node and worker nodes when a fault occurs.

Referring to FIG. 4B, diagram 450 illustrates a state of a master node and worker nodes corresponding to operation 350. When a fault occurs while the master node is being trained with N mini-batches, the worker node in which the fault has occurred may be detected.

Diagram 460 illustrates a state of the master node and the worker nodes corresponding to operations 320 and 330 when a fault occurs, and the master node that detects the fault may renew and transmit a new participant list to the remaining normal worker nodes. In addition, a worker node may restore an operation to its final checkpoint state because the fault occurred in training.

Figure 5:
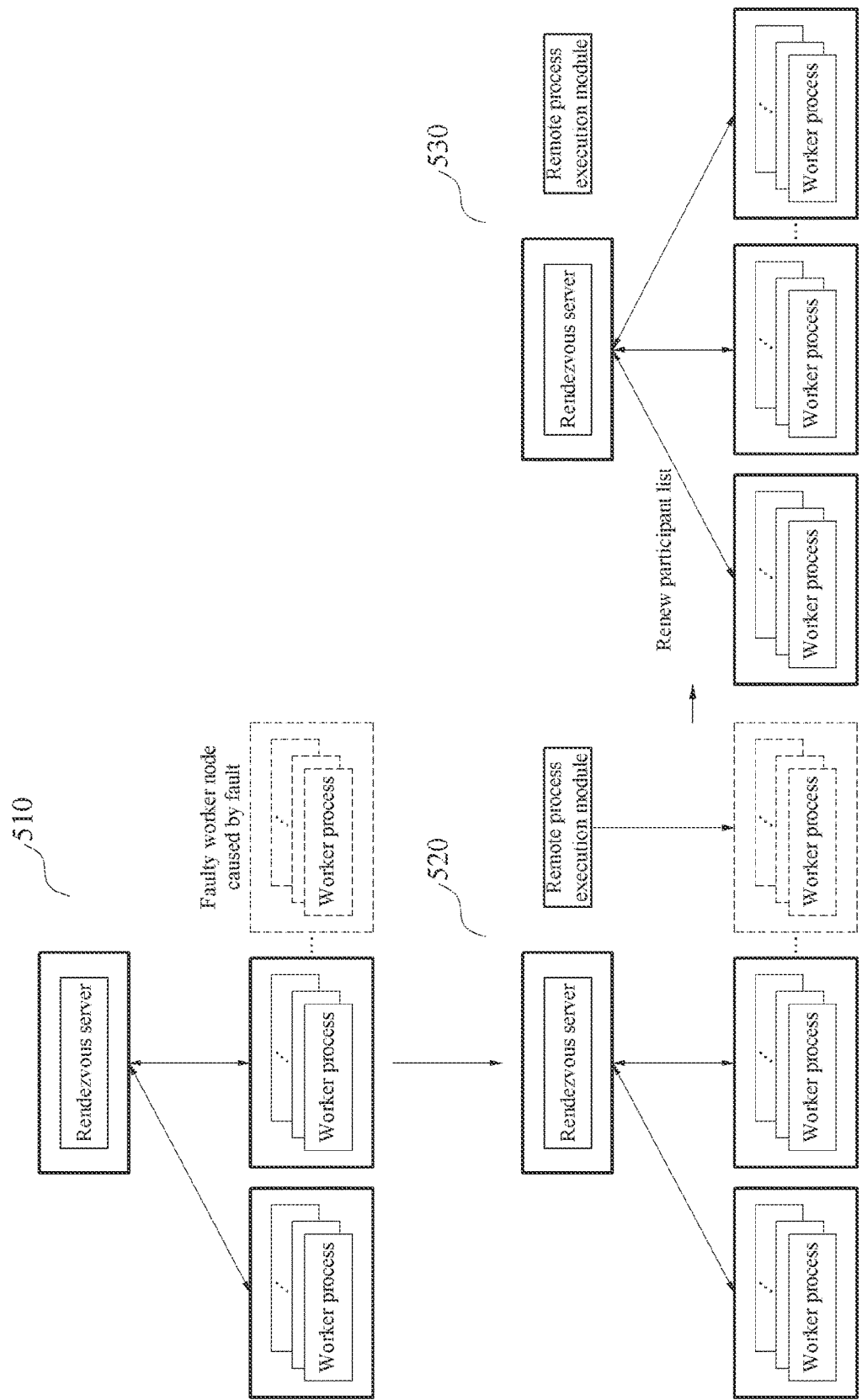
FIG. 5 illustrates an example of a remote worker process re-execution method.

FIG. 5 illustrates an example of a remote worker process re-execution method. The descriptions of FIGS. 1 to 4B may also apply to FIG. 5. Thus, a more detailed description thereof is omitted for brevity.

Referring to FIG. 5, a fault recovery system may further include a remote process execution module.

When a worker node that is temporarily unusable due to a fault becomes useable later through the remote process execution module, the fault recovery system may remotely re-execute worker processes and recover the number of worker processes before a state in which the fault occurred.

Referring to diagram 510, when a fault occurs in a distributed training operation, the fault may occur in a worker node.

Referring to diagram 520, when a worker node in which the fault occurred is recovered or when another node is useable instead, a faulty worker process may be re-executed through the remote process execution module. For example, the recovered worker node may transmit a message for checking a health state to a master node, and the master node may determine whether to recover the worker node based on the message. Thereafter, the master node may transmit a signal for re-executing the faulty worker process to the remote processor execution module.

Referring to diagram 530, when a new worker process is added, the master node may adjust the collective communication participant list by adding the recovered worker node.

Figure 6:
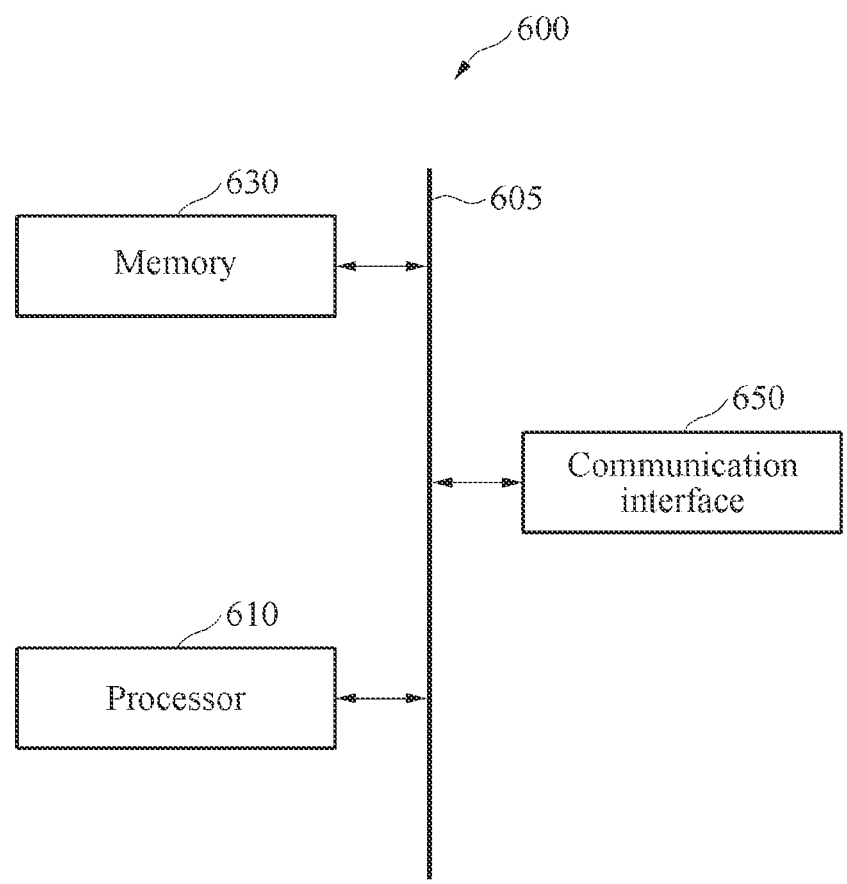
FIG. 6 illustrates an example of a fault recovery apparatus.

FIG. 6 illustrates an example of a fault recovery apparatus.

Referring to FIG. 6, a fault recovery apparatus 600 may be or include the master node described above with reference to FIGS. 1 to 5 (the master node 110 of FIG. 1, as a non-limiting example). The fault recovery apparatus 600 may include a processor 610 (e.g., one or more processors). The fault recovery apparatus 600 may further include a memory 630 and a communication interface 650. The processor 610, the memory 630, and the communication interface 650 may communicate with each another through a communication bus 605.

The processor 610 may be a hardware-implemented processing device having a physically structured circuit to execute desired operations. For example, the desired operations may include instructions or code in a program. The hardware-implemented processing device may be or include, for example, a microprocessor, a CPU, a GPU, a processor core, a multi-core processor, a multiprocessor, an application-specific integrated circuit (ASIC), a field-programmable gate array (FPGA), an NPU, a microcontroller (MCU), and/or the like.

The processor 610 may execute the program and control the fault recovery apparatus 600. Code of the program executed by the processor 610 may be stored in the memory 630.

The processor 610 may receive a state signal for verifying whether a fault occurred in a worker process performed by a corresponding worker node from each of the plurality of worker nodes in a collective communication participant list, determine whether the fault occurred in the worker process based on the state signal, adjust a new participant list excluding a worker node in which the fault occurred from the new participant list, based on a determination that the fault occurred, and transmit the newly adjusted participant list to one or more worker nodes included in the newly adjusted participant list.

The memory 630 may include read-only memory (ROM) 631 and static random-access memory (SRAM) 633. The ROM 631 may store a neural network model and code for a dynamic convolution operation.

The SRAM 633 may be used as working memory for operations performed by the processor 610 and store various application programs. The memory 630 may store a variety of information generated by a processing process of the processor 610 described above. In addition, the memory 630 may store a variety of data and various programs. The memory 630 may include a large-capacity storage medium such as a hard disk to store a variety of data.

In addition, the fault recovery apparatus 600 for performing the dynamic convolution operation may further include a display and a communication interface. The display may be, for example, a touch display and/or a flexible display, but is not limited thereto.

The fault recovery systems, master nodes, worker nodes, fault recovery apparatuses, processors, memories, communication interfaces, communication buses, fault recovery system 100, master node 110, worker nodes 150, fault recovery apparatus 600, processor 610, memory 630, communication interface 650, communication bus 605, and other apparatuses, units, modules, devices, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, bD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A system with fault recovery, the system comprising:
 a plurality of worker nodes comprising a plurality of computational modules configured to perform distributed training; and
 a master node configured to control the plurality of worker nodes, wherein the master node comprises a rendezvous server configured to:
 detect a fault of the plurality of worker nodes based on a predetermined period;
 adjust a collective communication participant list in response to the detecting of the fault; and
 transmit the adjusted participant list to one or more worker nodes in the adjusted participant list.

2. The system of claim 1, wherein, for the detecting of the fault, the master node is configured to receive a state signal for verifying whether the fault occurred in a worker process performed by a corresponding worker node from each of the plurality of worker nodes.

3. The system of claim 2, wherein, for the detecting of the fault, the master node is configured to determine whether the fault occurred in the worker process based on the state signal.

4. The system of claim 1, wherein, for the adjusting of the collective communication participant list, the master node is configured to adjust the collective communication participant list by excluding a worker node in which the fault occurred in response to the detecting of the fault.

5. The system of claim 1, wherein each of the plurality of worker nodes is configured to store, in a first memory, a copy of a working state performed in a corresponding period in response to the fault not occurring in the corresponding period.

6. The system of claim 1, wherein each of the one or more worker nodes in the adjusted participant list is configured to load a copy stored in a first memory and perform the distributed training based on the copy.

7. The system of claim 1, further comprising a remote process execution module configured to re-execute a worker process of a recovered worker node in response to a worker node, in which the fault occurred, being recovered.

8. The system of claim 7, wherein the master node is configured to adjust the collective communication participant list by adding the recovered worker node in response to the worker process being re-executed.

9. An apparatus with fault recovery, the apparatus comprising:
　one or more processors comprising a rendezvous server configured to:
　　receive a state signal for verifying whether a fault occurred in a worker process performed by a corresponding worker node from each of a plurality of worker nodes in a collective communication participant list;
　　determine whether the fault occurred in the worker process based on the state signal;
　　adjust the participant list by excluding, from the participant list, a worker node in which the fault occurred based on a determination that the fault occurred; and
　　transmit the adjusted participant list to one or more worker nodes in the adjusted participant list,
　wherein a plurality of computational modules of the plurality of worker nodes are configured to perform distributed training based on the adjusted participant list.

10. A processor-implemented method with fault recovery, the method comprising:
　detecting, by a rendezvous server of a master node, a fault of a plurality of worker nodes based on a predetermined period;
　adjusting, by the rendezvous server, a collective communication participant list in response to the detecting of the fault;
　transmitting, by the rendezvous server, the adjusted participant list to one or more worker nodes in the adjusted participant list; and
　training a predetermined number of mini batches in each of the one or more worker nodes in the adjusted participant list.

11. The method of claim 10, wherein the detecting of the fault further comprises receiving, by the master node, a state signal for verifying whether the fault occurred in a worker process performed by a corresponding node from each of the plurality of worker nodes.

12. The method of claim 11, wherein the detecting of the fault further comprises determining, by the master node, whether the fault occurred in the worker process based on the state signal.

13. The method of claim 10, wherein the adjusting of the collective communication participant list comprises adjusting, by the master node, the collective communication participant list by excluding a worker node in which the fault occurred in response to the detecting of the fault.

14. The method of claim 10, further comprising storing, in a first memory, a copy of a working state performed in a corresponding period in response to the fault not occurring in the corresponding period in each of the plurality of worker nodes.

15. The method of claim 10, wherein the training of the mini batches comprises loading a copy stored in a first memory and performing distributed training based on the copy in each of the plurality of worker nodes.

16. The method of claim 10, further comprising re-executing, in a remote process execution module, a worker process of a recovered worker node in response to a worker node, in which the fault occurred, being recovered.

17. The method of claim 16, further comprising adjusting, by the master node, the collective communication participant list by adding the recovered worker node in response to the worker process being re-executed.

18. A non-transitory computer-readable storage medium storing instructions that, when executed by one or more processors, configure the one or more processors to perform the method of claim 10.

\* \* \* \* \*